United States Patent
Palmer et al.

(10) Patent No.: US 10,078,606 B2
(45) Date of Patent: Sep. 18, 2018

(54) DMA ENGINE FOR TRANSFERRING DATA IN A NETWORK-ON-A-CHIP PROCESSOR

(71) Applicant: KNUEDGE, INC., San Diego, CA (US)

(72) Inventors: Douglas A. Palmer, San Diego, CA (US); Jerome Vincent Coffin, San Diego, CA (US); Andrew Jonathan White, Austin, TX (US); Ramon Zuniga, San Diego, CA (US)

(73) Assignee: KnuEdge, Inc., San Diego, CA (US)

( * ) Notice: Subject to any disclaimer, the term of this patent is extended or adjusted under 35 U.S.C. 154(b) by 267 days.

(21) Appl. No.: 14/953,594

(22) Filed: Nov. 30, 2015

(65) Prior Publication Data

US 2017/0153993 A1    Jun. 1, 2017

(51) Int. Cl.
| | | |
|---|---|---|
| G06F 13/20 | (2006.01) | |
| G06F 13/28 | (2006.01) | |
| G06F 13/16 | (2006.01) | |
| G06F 15/78 | (2006.01) | |
| G06F 15/173 | (2006.01) | |

(52) U.S. Cl.
CPC .......... *G06F 13/28* (2013.01); *G06F 13/1652* (2013.01); *G06F 15/17375* (2013.01); *G06F 15/7825* (2013.01); *Y02D 10/14* (2018.01)

(58) Field of Classification Search
USPC .......................... 710/308, 22–24, 31, 36–38
See application file for complete search history.

(56) References Cited

U.S. PATENT DOCUMENTS

| | | | |
|---|---|---|---|
| 9,185,057 B2 | 11/2015 | Palmer | |
| 9,674,114 B2 * | 6/2017 | Park | H04L 49/101 |
| 2006/0031604 A1 * | 2/2006 | Fukawa | G06F 13/28 |
| | | | 710/22 |
| 2007/0033369 A1 * | 2/2007 | Kasama | G06F 15/8007 |
| | | | 711/170 |
| 2011/0320672 A1 * | 12/2011 | Ganapathy | G06F 13/28 |
| | | | 710/308 |
| 2015/0278131 A1 * | 10/2015 | Hesse | G06F 13/28 |
| | | | 710/308 |

(Continued)

OTHER PUBLICATIONS

Control Data Corporation. "Peripheral Processor Unit Description." CDC 7600/CYBER 70 Model 76 Computer Systems Hardware Reference Manual. 1975.

(Continued)

*Primary Examiner* — Raymond Phan
(74) *Attorney, Agent, or Firm* — Pierce Atwood LLP (57) ABSTRACT

A multiprocessor architecture utilizing direct memory access (DMA) processors that execute programmed code to feed data to one or more processor cores in advance of those cores requesting data. Stalls of the processor cores are minimized by continually feeding new data directly into the data registers within the cores. When different data is needed, the processor cores can redirect a DMA processor to execute a different feeder program, or to jump to a different point in the feeder program it is already executing. The DMA processors can also feed executable instructions into the instruction pipelines of the processor cores, allowing the feeder program to orchestrate overall processor operations.

20 Claims, 8 Drawing Sheets

(56) References Cited

U.S. PATENT DOCUMENTS

2016/0011994 A1* 1/2016 Bouley .............. G06F 13/1663
710/308
2016/0344629 A1* 11/2016 Gray ....................... H04L 45/60

OTHER PUBLICATIONS

IBM. IBM System/360 and System/370 I/0 Interface Channel to Control Unit Original Equipment Manufacturer's Information. 9th Ed. Mar. 1986.
Thornton. "Peripheral Subsystem." Design of a Computer The Control Data 6600. 1970.

* cited by examiner

DMA ENGINE FOR TRANSFERRING DATA IN A NETWORK-ON-A-CHIP PROCESSOR

BACKGROUND

Direct memory access (DMA) is used by computer systems to enable hardware subsystems to access main system memory independently of the central processing unit (CPU). Without DMA, when the CPU is managing programmed input/output memory operations, the CPU is typically fully occupied for the entire duration of a read or write operation, such that the CPU is unavailable to perform other work. With conventional DMA, the CPU first initiates the memory transfer, then it does other operations while the transfer is in progress, and it finally receives an interrupt from the DMA controller when the operation is done.

DMA is also useful at times that the CPU cannot keep up with a rate of data transfer, or when the CPU needs to perform useful work while waiting for a relatively slow input/output (I/O) data transfer. Many hardware systems use DMA, including disk drive controllers, graphics cards, network cards and sound cards. DMA may also be used for intra-chip data transfer in multi-core processors. Computers that have DMA channels can transfer data to and from devices with much less CPU overhead than computers without DMA channels. Similarly, a processing element inside a multi-core processor can transfer data to and from its local memory without occupying its processor time, allowing computation and data transfer to proceed in parallel.

While DMA can significantly lower the burden involved in data transactions on the CPU, a CPU that needs information must still issue a transaction request to the DMA controller instructing the DMA controller to execute the I/O data transfer (e.g., fetch data from storage). In a typical case, a DMA engine has a set of registers that the CPU must set to values that specify the operation to be carried out by the DMA engine. Once this specification is complete, the DMA engine can carry out a task independently, without further intervention of the CPU. When that single task is complete, however, the CPU must again load the DMA engine's registers with appropriate values to carry out another task. The CPU also must still collect the results from memory, moving the data from memory into its execution registers after it receives an interrupt from the DMA controller indicating that the data is available (i.e., that the I/O fetch operation is complete).

Thus, although the use of DMA can significantly reduce the data bottleneck associated with I/O transactions, the CPU must still interrupt other tasks to carry out operations related to data transfers. Furthermore, these interruptions typically have a substantial cost. The CPU typically needs to save its current state, set up the DMA transfer, and restore the saved state to go back to executing the task that was being accomplished before the interruption took place.

BRIEF DESCRIPTION OF DRAWINGS

For a more complete understanding of the present disclosure, reference is now made to the following description taken in conjunction with the accompanying drawings.

DETAILED DESCRIPTION

Multi-processor computer architectures capable of parallel computing operations were originally developed for supercomputers. Today, with modern microprocessors containing multiple processor "cores," the principles of parallel computing have become relevant to both on-chip and distributed computing environments.

Figure 1:
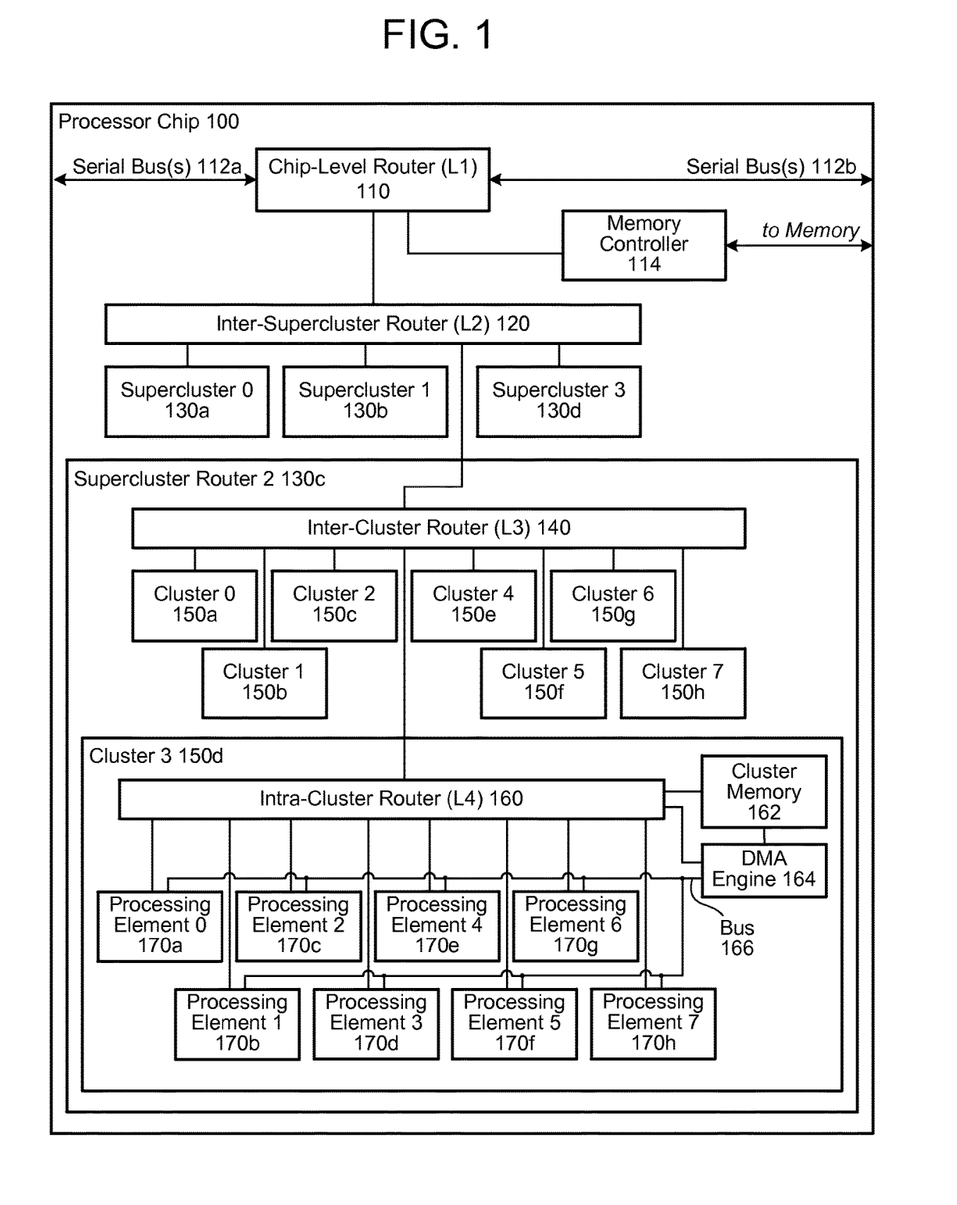
FIG. 1 is a block diagram conceptually illustrating an example of a network-on-a-chip processor where multiple processing elements share a DMA engine.

FIG. 1 illustrates a multiple core processing system based on a system-on-a-chip architecture. The processor chip 100 architecture is structured as a nested hierarchy, with clusters 150 of processing elements 170 at its base. The processing elements 170a to 170h of each cluster share a "smart" DMA engine 164 that executes a program to feed data directly to the processing elements 170a-h. The DMA engine 164 executes a data "feeder" program using an instruction set in a manner similar to that of a CPU, but the instruction set is optimized for data transactions such as reading, writing, and transmitting data. The improved DMA engine 164 can carry out many data transfer operations on behalf of the associated processing element CPUs, relieving the CPUs of carrying out those tasks so that the CPU cores can dedicate most of their time to carrying out computations and other operations.

The DMA engine 164 may support an instruction set similar to that of a CPU, but may be limited scope, reducing each DMA engine's structural complexity. Among other things, each DMA engine's instruction set may be devoted primarily to data transfers rather than the computations, bitwise and logical operations, comparisons, branching, etc., that typically dominate a CPU's instruction set.

Reducing the instruction set minimizes the costs (e.g., power consumption, chip surface area) of implementing each DMA engine 164, and allows the vast majority of the DMA engine's circuitry to be devoted to its real job: transferring data. The combination allows each processing element 170 to devote its time to carrying out the real computations involved in a process, while the DMA engine carries out data transfers. As long as data necessary for both a DMA engine 164 and the associated processing element(s) 170 is available, both can carry out their tasks in parallel. When or if only one is needed, the other can be shut down to reduce power usage.

Figure 2:
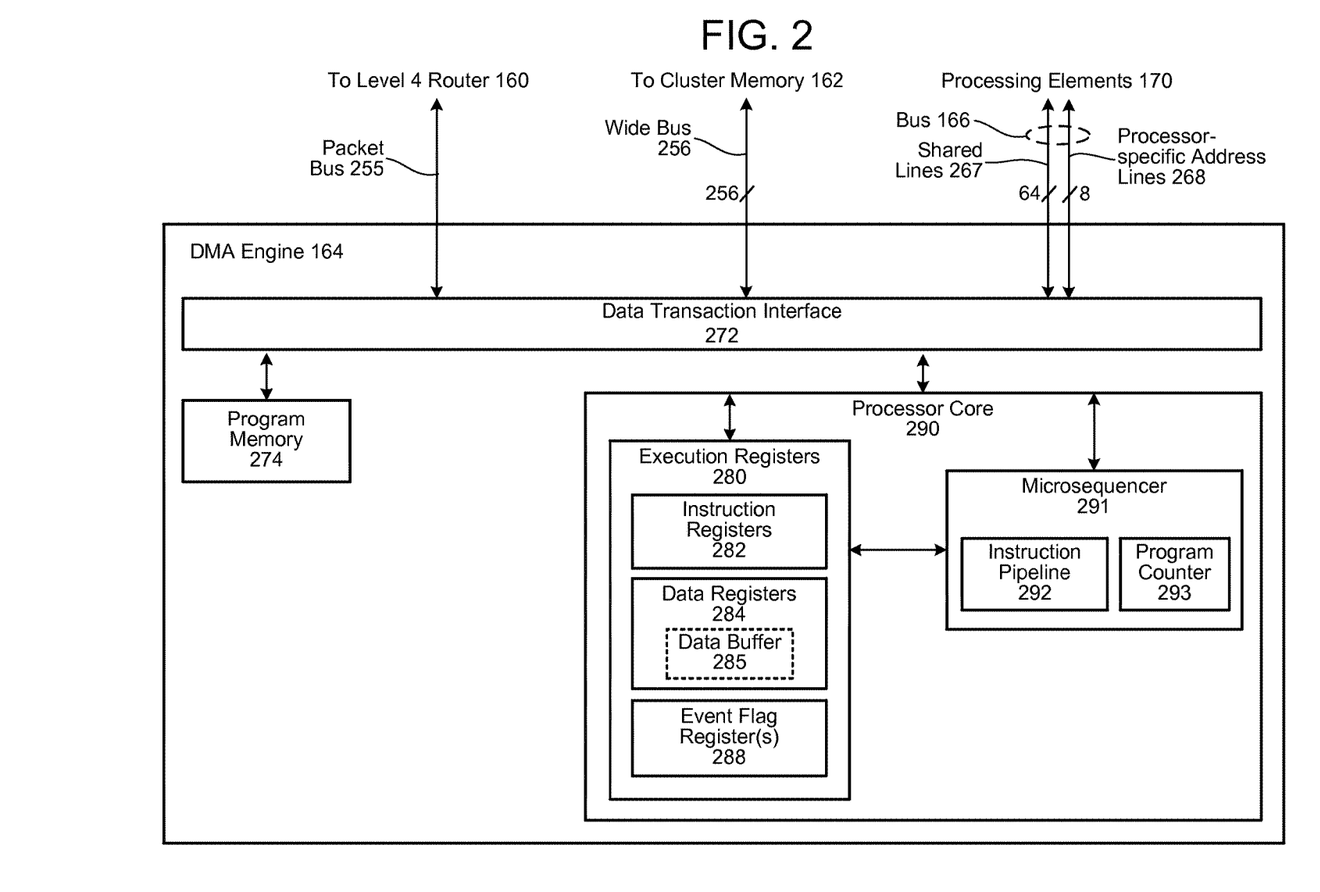
FIG. 2 is a block diagram conceptually illustrating example components of a DMA engine.
Figure 3:
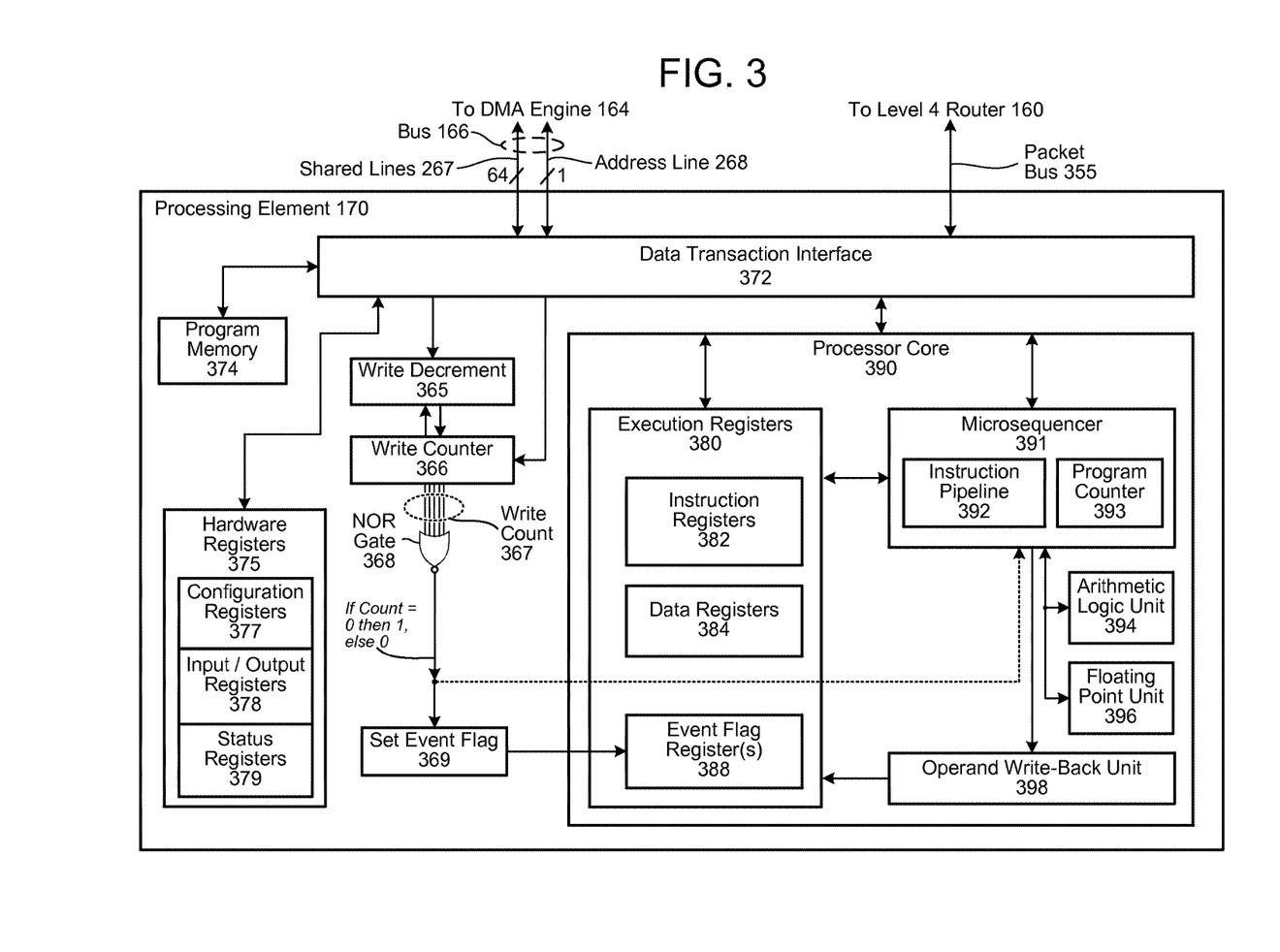
FIG. 3 is block diagram conceptually illustrating example components of a processing element.

FIG. 2 is a block diagram conceptually illustrating example components of a DMA engine of the architectures in FIG. 1. FIG. 3 is a block diagram conceptually illustrating example components of a processing element 170 of the architecture in FIG. 1.

The DMA engine 164 executes programmed instructions which control where and when data is pushed to the individual processing elements 170. The DMA engine 164 may also be used to push executable instructions to the program memory 374 and instruction registers 382 of a processing element 170 for execution by that processing element's instruction pipeline. The program memory 374 may be globally addressable and is used to store instructions that may be fetched by the micro-sequencer 391 of the processor core 390 in accordance with a program counter 393 that specifies the memory address from which instructions should be fetched.

Whereas the core 390 of the processing element 170 may include an arithmetic logic unit (ALU) 394, a floating point unit 396, and an operand write-back unit 398 to store results from logical operations in a set of data registers 384, the processor core 290 of the DMA engine 164 may have simpler logic.

Each DMA engine 164 may have a set of execution registers 280 including runtime instruction registers 282 for execution for storing executable instructions of the feeder program, and a set of data registers 284. The data registers 284 may include registers that are used as a data buffer 285 to temporarily queue data retrieved from a memory for transfer to a processing element 170. Each DMA engine 164 may also include addressable program memory 274 external to the core 290. The program memory 274 may be globally addressable and may be used to store instructions that will be fetched by the micro-sequencer 291 of the processor core 290 in accordance with a program counter 293 that specifies the memory address from which instructions should be fetched.

The basic operational concept is to avoid having the processing elements 170a to 170h spending their time fetching data from memory and instead have a separate DMA processor 164 that can push the data to the processing elements 170a to 170h, and signal the processing element(s) when a transferred chunk of data has been loaded into the processing elements. As used herein, a "chunk" of data is an arbitrary quantity. Each processing element 170 can then start processing the newly loaded data. This facilitates the processor core 390 of each processing element 170 spending more time processing data, and shifting the burden to the DMA's processor core 290 to deal with transferring data. Stalls of the processing element's instruction execution pipeline 392 may thereby be reduced.

The DMA engine 164 may load data directly into the execution registers 380 of the processing elements 170a-170h, which are internal to the processor cores 390, thereby reducing or eliminating processor stall, as the latency between each processing element's processor core and its execution registers is typically only a cycle or two of the system clock. If an executed decision by a processing element 170 necessitates a change in the data needed by the processing element 170, the processing element 170 may direct the DMA engine's processor core 290 to execute a different program, or to jump to a different address of the program already being executed.

The internal execution registers 380 of the processing element's processor core 390 may include instruction registers 382, where instructions for execution by the core's instruction execution pipeline 392 are stored, and data registers 384, where data such as operands to be processed may be stored. Conventional processing elements commonly include two types of registers: those that are both internally and externally accessible, and those that are only internally accessible. The hardware registers 376 in FIG. 3 illustrate examples of conventional registers that are accessible both inside and outside the processing element 170, such as configuration registers 377 that may load an initial "boot" address or executable instruction(s) when the core 390 is first powered on, input/output registers 378, and various status registers 379.

The internally accessible registers in conventional processing elements may also include instruction registers and operand registers, but ordinarily are not directly addressable to receive DMA data transfers. These registers are ordinarily for the exclusive use of the core for the execution of operations, with the instruction registers storing the instructions currently being executed, and the data registers storing operands, where the instructions and operands are fetched from externally addressable hardware registers or other memory as needed for the execution of pipeline instructions. Such internally accessible registers are ordinarily only directly addressable by/accessible to components of the instruction execution pipeline (e.g., an instruction decode component, an operand fetch component, an instruction execution component, etc.).

In comparison, the execution registers 380 of the processor core 390 in FIG. 3, which are directly connected to the core's micro-sequencer 391, may also directly accessible to the DMA engine 164. The DMA engine 164 can directly access a core's internal data registers 384 via bus 166, feeding data directly into the processing element's core 290. The data registers 384 may store, among other things, the operands utilized by the processor core 390 as input, and to store processed data.

The DMA engine 164 may be connected to multiple busses of varying speed and bandwidth. A packet bus 255 may be used to connect the data transaction interface 272 to the Level 4 router 160 of the cluster 150. A wide, high-speed parallel bus 256 may be use to connect the DMA engine 164 directly to the cluster memory 162. The wide bus 256 may be, for example, 256 bits wide, transferring 256 bits per clock cycle (or 512 bits per clock cycle if a double data rate is used). The bus 166 that connects the DMA engine 164 to the processing elements 170 may include shared lines 267 (e.g., 64 bits wide) and processor-specific address lines 268, which are used to indicate which processing elements 170 are to store the data on the shared lines 267. In a typical implementation, the wide bus 256 will have a higher maximum bandwidth (maximum data transfer rate) than the shared lines 267 of the bus 166 (e.g., bus 256 has more lines and/or is clocked at a higher frequency than bus 166), although a same bandwidth may be provided. However, since the shared lines 267 may be time-multiplexed among processing elements 170a-h (or groups of processing elements if using simultaneous multi-casting to multiple processing elements), the bandwidth to each processing element 170 may be less than the total bandwidth of the shared lines 267.

Figure 4:
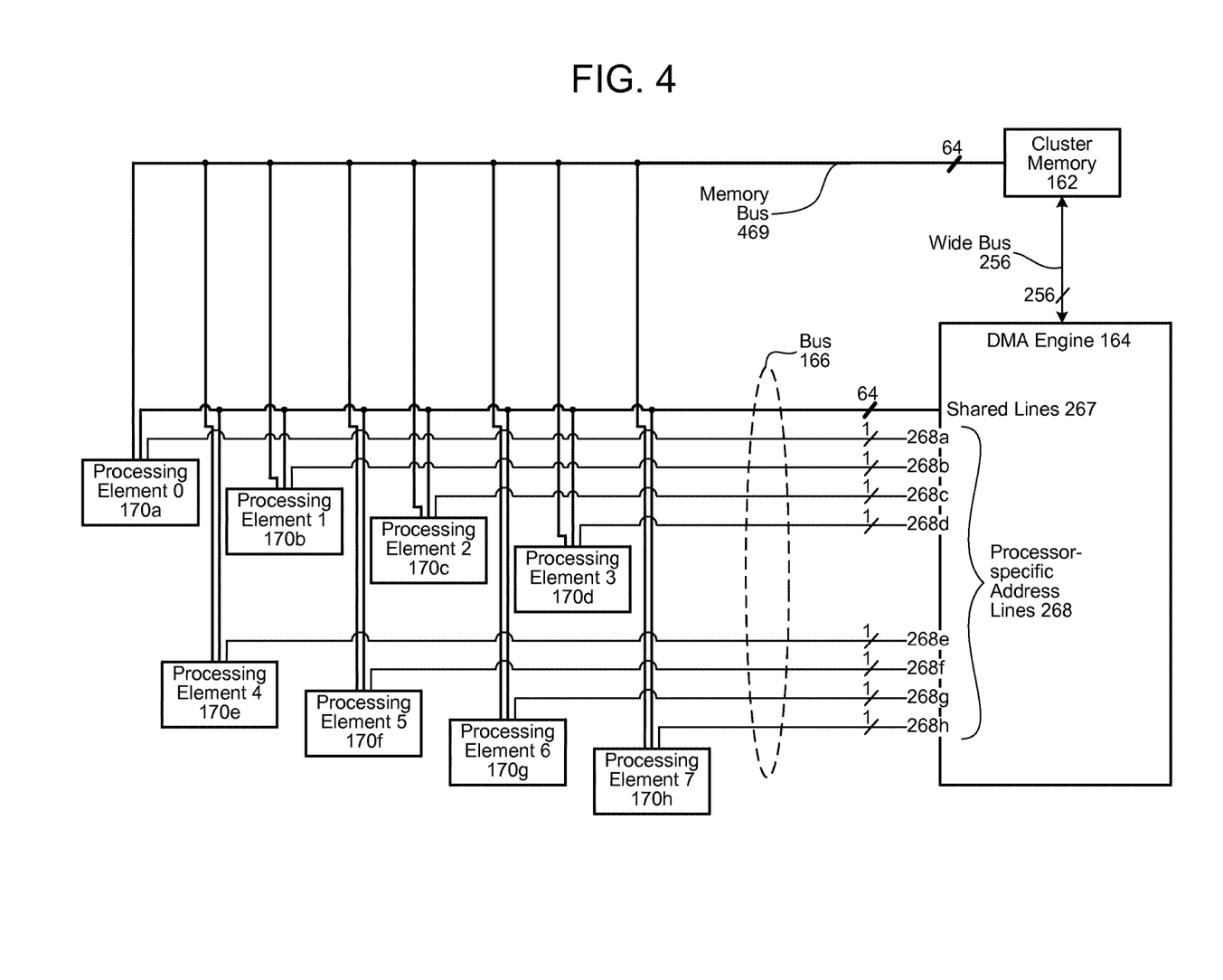
FIG. 4 illustrates an example structure of a bus that may be used by the DMA engine to multi-cast data to multiple processing elements at a same time.

FIG. 4 illustrates an example of the bus 166 connecting the DMA engine 164 to its processing elements 170a to 170h. The bus 166 include shared data and/or address lines 267 shared by all of the processing elements 170 within the cluster 150. To accommodate simultaneously loading data into the program memory 374 or execution registers 380 of multiple processing elements 170, the bus 166 includes processor-specific address lines 268a to 268h. By toggling one-or-more processor-specific address lines 268, the DMA engine 164 controls which processing elements load data, while the shared lines 267 indicate the address of the registers within the particular processing elements receiving the data. Each processing element 170a-h may also be connected directly to cluster memory, such as by shared memory bus 469. Instead of shared memory bus 469, a dedicated bus connection to memory may be provided to each processing element (i.e., eight separate busses to memory 162).

Unlike a conventional DMA controller, the improved DMA engine 164 executes a programmable instruction set. This allows the DMA core 290 to execute a feeder program that makes the DMA engine's action proactive rather than reactive. A processing element 170 may either direct the DMA engine 164 to execute the feeder program, or execute instructions provided by the feeder program. Thus, rather than merely copying data to a location accessible to a CPU pursuant to explicit instructions from the CPU, the DMA engine 164 becomes an integral part of the overall operations performed by the processing element(s) 170, and can actually orchestrate processing elements operations.

Among other things, the feeder program may carry out memory fetch operations, autonomously performing operations, in comparison to simply copying some data as instructed by a CPU and then signaling the CPU when it is done. Conventionally, after the data is copied, the controlling CPU would need to give a conventional DMA controller specific instructions to again tell it to transfer a block of data from one location to another. In comparison, by virtue of executing programmable instructions, the DMA engine 164 may execute complex operations such as autonomously executing load loops. This affords the DMA engine 164 a high degree of autonomy.

For example, in addition to being able to feed data to a processing element 170 without a particular request from the processing element 170 to do so, the DMA engine 164 can feed executable instructions into the processing element's program memory 374 and/or instruction registers 382, slaving operations of the processing element 170 to the feeder program executed by the DMA engine 164 (instead of the opposite).

Conventionally, a DMA controller will include around three or four registers that tell the DMA controller the start address for a transfer, the destination address for the transfer, and the length of the transfer. However, once the DMA controller performs the transfer in accordance with the register data, the DMA controller would signal the requesting CPU (e.g., sending an interrupt signal) and wait for another transfer request. The responsibility to request more data remains with requesting CPU, which must again load parameters into the registers of the DMA controller to configure another DMA transfer.

More sophisticated DMA controllers can perform scatter-gather. Scatter-gather still executing simple transfers, but instead of giving the DMA controller one starting address and a length, the CPU send may send multiple starting addresses and lengths, which the DMA controller queues. In some implementations of scatter-gather, the lengths of the transfers are assumed to be the same except possibly the first and last. For example, when a CPU is uses four kilobyte pages for virtual addressing, the CPU may handle page translation, translating the virtual address into a physical addresses in memory. Each four-kilobyte page may have an arbitrary address for the beginning of the page. The CPU's program might read 64 kilobytes of data composed of eight 8-kilobyte pages, while the actual address of those pages might be from a different physical location and memory (e.g., they might not be contiguous). However, page translation tables make the different physical locations appear contiguous to code running on the CPU. And so a device driver may look up the physical addresses of those 8 pages, and instruct the DMA controller to a the starting address of each of the eight 8-kilobyte pages. The DMA controller would then gather together all of the data from those pages.

In comparison, the micro-sequencer 291 of the DMA engine 164 executes instructions as specified in the feeder program, transferring multiple units of data to the processing element 170 in accordance with feeder program instructions. The feeder program executed by the DMA engine 164 may optionally be configured to generate a notification to a processing engine's core after a certain number of instructions or a certain quantity of data is written to the processing element's program memory 374 or execution registers 380, if such a notification is needed. The DMA engine 164 does not keep count of how many writes have taken place. Instead, at the end of a write or series of writes to a processing element 170, a feeder program instruction may cause the DMA engine 164 to signal the data transaction interface 372 of the processing element 170 to trigger an event flag in an event flag register 388 of the processor core 390. The signal may be in the form of an explicit write to the event flag register, or may be indicated by the type of write used for the transfer (with the data transaction interface 372 triggering the event flag in response to the write code).

Figure 5:
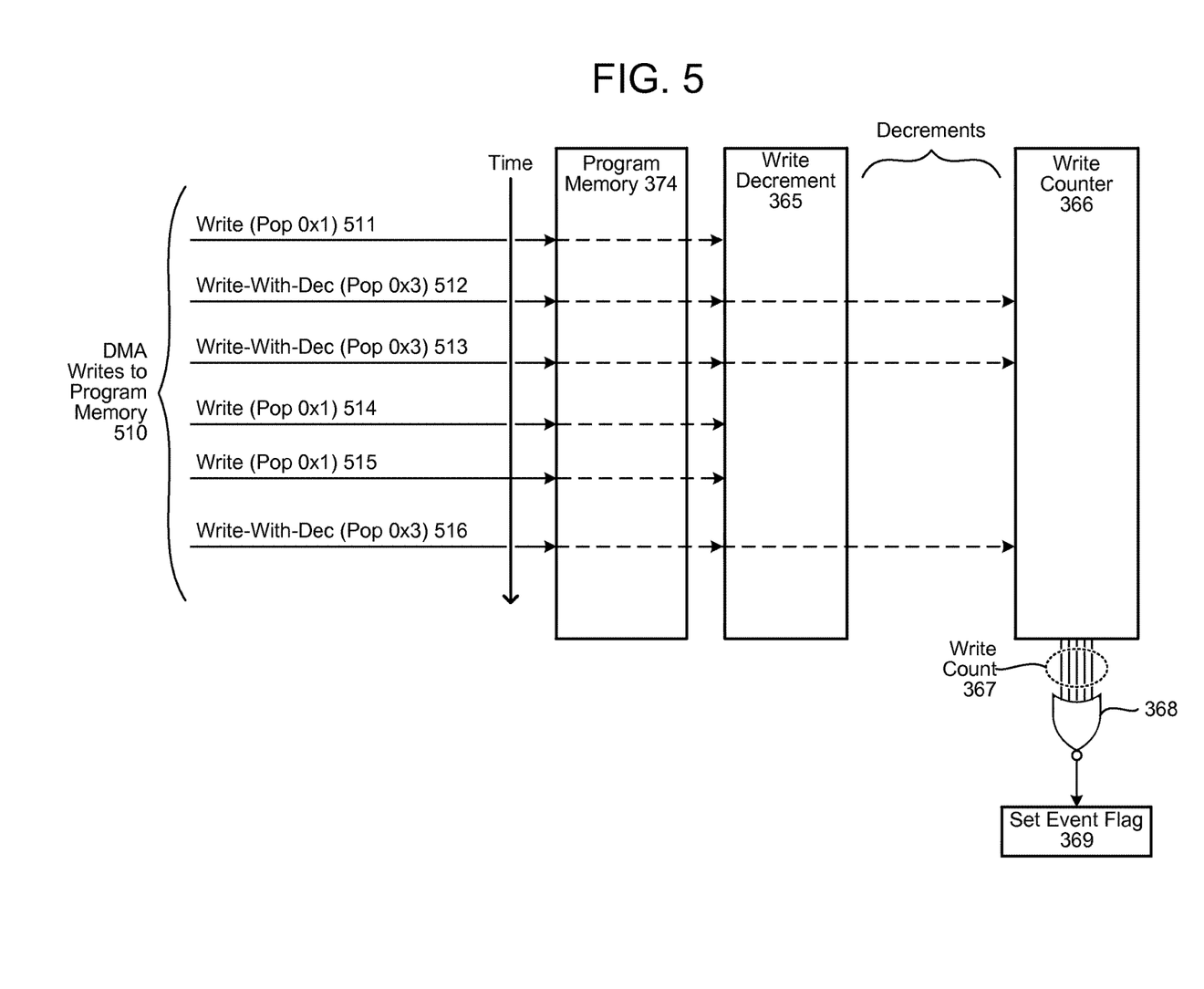
FIG. 5 is a block diagram illustrating how an event can be signaled to the core of the processing element after a specified number of DMA writes have occurred.

As another approach, at the beginning of writing to the processing element 170, a feeder program instruction may cause the DMA engine 164 to set a write counter 366 of the processing element 170. Then, either with each write or writes that indicate to decrement by the DMA engine 164, the data transaction interface 372 triggers a write decrement 365 to decrement the write counter 366. The write count 367 on the write counter 366 reaches zero, a NOR gate 368 toggles states, triggering a set event flag 369 operation, setting the event flag register 388 of the processor core 390. The micro-sequencer 391 of the processor core 390 may determine that the event flag register 388 is set by polling the register, or may have a dedicated bit line that indicates either a state of the register flag or an output state of gate 368.

FIG. 5 illustrates an example of how a core 390 of a processing element 170 from FIG. 3 may determine when a specified number of writes 510 by the DMA engine 164 have occurred. As part of a write or write sequence, the feeder program executed by the DMA engine 164 causes a count value to be written to the write counter 366 of a processing element 170. The feeder program may write to the processing element 170 using a write-with-decrement or an ordinary write. Write-with-decrement causes the write decrement circuit 365 to decrement the write counter 366, whereas plain writes do not. This allows multiple writes-per-function, with only one of the writes triggering a decrement. For example, the DMA engine 164 may use a series of writes to transfer an instruction and its operands to the processing element's program memory 374, using a write-with-decrement for the instruction and a plain write for the operands. The binary count (write count 367) of the write counter 366 is read by an output circuit (e.g., NOR gate 368), and when the count reaches zero, the output circuit triggers the setting of an event flag 369 (e.g., transitioning from low to high).

In the example in FIG. 5, the DMA engine 164 writes data comprising three instructions to a processing element's program memory 374 via the bus 166. The data comprising the first instruction is written to program memory 374 using a write without decrement 511, and a write with decrement 512. This data may be, for example, an opcode and an operand. The data comprising the second instruction is written to program memory 374 using a single write with decrement 513. The data comprising the third instruction is written to program memory 374 using two writes-without-decrement 514/515 and a write-with-decrement 516. Using this approach, the number of writes that trigger a decrement may correspond to the number of instructions transferred, allowing the number of writes per instruction to vary as needed (e.g., to accommodate operands varying in length and number).

The feeder program executed by the DMA engine's processor core 290 can set up a loop, such as sending the same data iteratively to a different processing element 170, with a different processing element 170 (or multiple processing elements 170) being fed on each iteration of the loop. The DMA engine 164 may multicast the same data to multiple different processing elements simultaneously by using the processor-specific address lines 268 to designate the recipient processing elements, depositing the same data at the same local addresses within each designated processing element.

Being able to "multicast" data to simultaneously, with the multicast data being stored within the processing elements (e.g., loading program memory 374 or execution registers 380), has several advantages over loading the data into a memory and then signaling multiple CPUs that the data is available. Among the advantages is that this multi-cast-based approach avoids multiple processors attempting to read the same data from memory multiple times (increasing bus transactions), or sending competing requests that must be queued. Using the multicast capability afforded by the bus structure in FIG. 4, a single bus transaction is all that is required to feed the memory/registers within multiple processing elements.

Each processing element may have a local program memory 374 external to the processor core 390, in addition to the execution registers 380 internal to the processor core 390. Instruction registers 382 of the execution registers 380 may themselves comprise a modest amount of memory, such as two kilobytes to store instructions for the instruction execution pipeline 392. Instructions and data in the execution registers 380 are accessible to the instruction execution pipeline 392 of the micro-sequencer 391 within as little as one or two clock cycles of the system clock (depending upon the unit size of the instruction/data), whereas access to instructions and data in the program memory 374 may be slower, as the data is copied into the execution registers 380 prior to execution.

The DMA engine 164 may write directly to either the program memory 374 or the execution registers 380. The processing elements 170 may designate a portion of memory or registers to serve as queues/buffers to receive incoming data from the DMA engine 164, or the designation of memory or registers may be dictated by the feeder program executed by the DMA engine's processor core 290.

The feeder program executed by the DMA engine 164 can pre-queue in a fast feeder queue (e.g., in data buffer 285 in FIG. 2) at least a portion of data retrieved from a memory (e.g., cluster memory 162) in advance of writing that data to a processing element 170. For example, each 256 bit transaction with the cluster memory 162 can be stored in the data buffer 285 and then parceled out in 64 bit chunks. The data buffer 285 may be arranged as a single fast feeder queue, or may be partitioned into multiple queues (e.g., one queue for each served processing element 170). After the processing element 170 has processed a chunk data already received, the DMA engine 164 can initiate another data transfer to the processing element 170 without the processing element 170 specifying what to transfer. When a program executed by the processing element 170 signals to the DMA engine 164 that it needs data, the DMA engine 164 may already have the destination address and transfer size by virtue of the feeder program executed by the processor core 290 controlling the DMA engine's operation.

For example, when a program executed on a processing element 170 is configured to initiate a new data transfer, an instruction executed on the processing element 170 may send a request to the DMA engine 164 indicating an address in memory containing executable code. The microsequencer 291 will then load the address into the instruction pipeline 292, or if so configured, flush the instruction pipeline 292 and load the new instruction. As an alternative to sending a request, the processing element 170 may instead overwrite the DMA engine's program counter 293 with the instruction address, such that the next instruction retrieved by the instruction pipeline 292 will be the new instruction. The memory address may be any "global" address, including an address to code within the DMA engine's own program memory 274, in cluster memory 162, etc.

Figure 6:
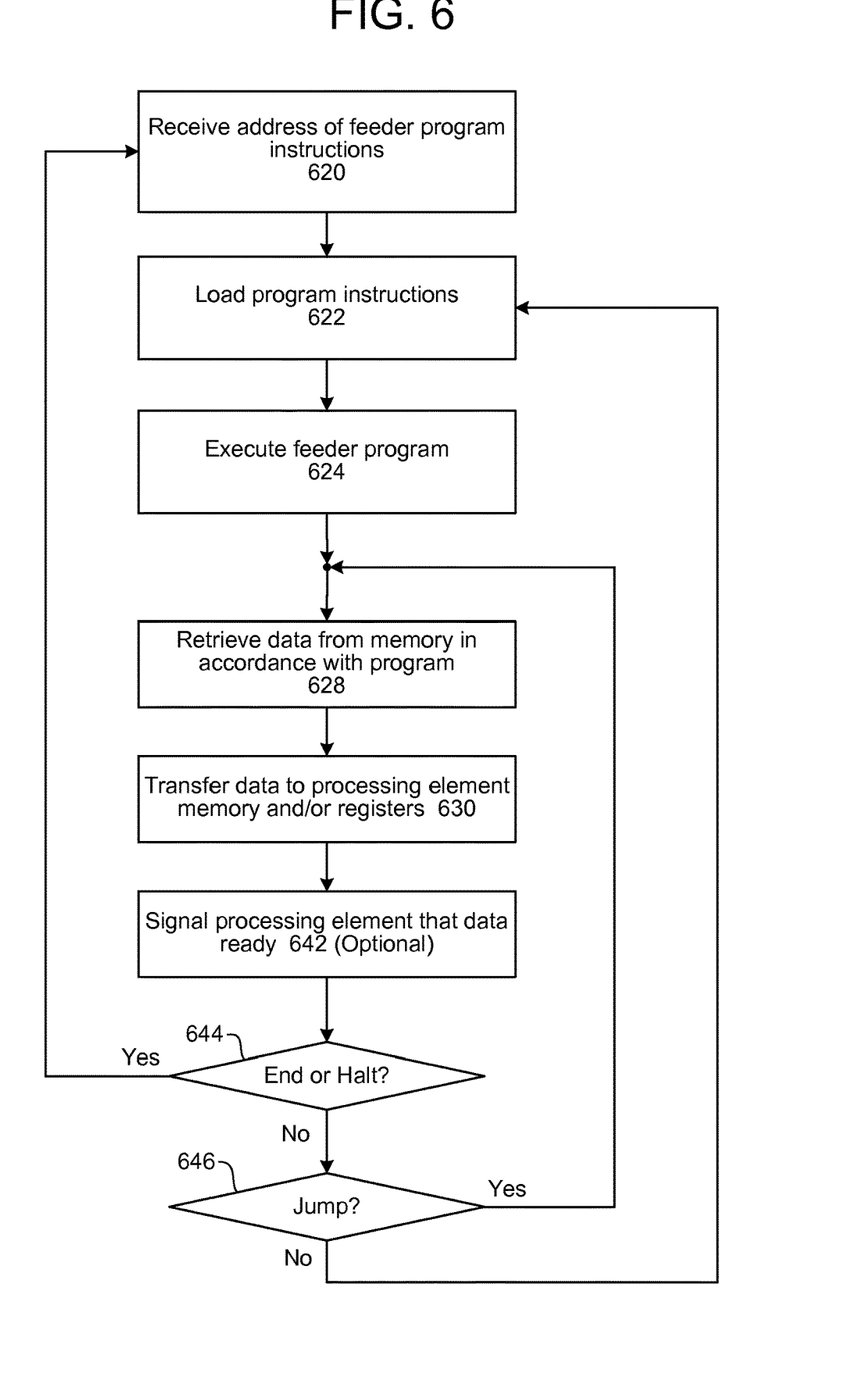
FIG. 6 is an example of a process executed by a DMA engine to feed data directly to a processing element.

In any case, referring to FIG. 6, the processor core 290 receives (620) the address directing it to an instruction of a feeder program. The microsequencer 291 of the DMA engine's processor core 290 loads (622) the instruction into the instruction pipeline 292, beginning code execution (624) starting from the instruction from the designated address, and then loading subsequent instructions until an executed instruction indicates to load from elsewhere or to stop loading. Also, if an external "halt" instruction is received (e.g., with a new program address) or the program counter 293 is overwritten by another component (e.g., by a processing element 170), then the micro-sequencer 291 stops loading the instruction sequence it had been loading. In addition to receiving an address for a feeder program from a processing element 170 or other component, a data distribution feeder program can be pre-loaded on the DMA engine 164 (e.g., a bootstrapping program), with the DMA engine 164 initiating data distribution without having received an initial request from a processing element 170.

In accordance with the feeder program data, the DMA engine's instruction pipeline 292 retrieves data (628) from memory in accordance with the executed program, transfers (630) the data to the processing element 170 (e.g., into its instruction registers 384, data registers 384, and/or program memory 374). If the feeder program included setting the write counter 366 of the processing element 170 at the start of the transfers (optional), then processing element is decrementing the write decrement counter 366 as the writes are received. Similarly optional, the feeder program may specify to set (642) an event flag register 388 of the processing element 170 after the instructions are transferred (630). If a halt instruction is included in the feeder program (644 "Yes"), or is received from an external component (e.g., a processing element 170 or another component such as a DMA engine external to the cluster 150), then the DMA engine 164 halts execution of the current program and begins executing another program in accordance with a received address 620. If no new program address is received, the DMA engine 164 may wait until a new program address is received (620).

Although the program "halt" 644 in FIG. 5 is illustrated as being a sequential operation in the execution loop, if the program counter 293 of the DMA engine's micro-sequencer 291 is overwritten, then execution of the current program is halted and operations continue from the new address.

If the program has not been halted (644 "No"), then execution continues in accordance with either a "jump" instruction back to another part of the loaded program (646 "Yes"), or by loading additional program instructions (646

"No"). Absent a halt instruction (the end of the feeder program also constituting a "halt") or the program counter 293 being overwritten by a write from another component, this looping continues indefinitely. Optionally, when the program ends (e.g., by branching to an explicit "halt" instruction or by simply ending), an address for a next program that was received without a halt command may be queued by the DMA engine 164, such that the next program is loaded after a current program ends.

A bootstrapping program that loads the DMA engine's feeder program may initiate a processing element's execution after the processor chip 100 first powers up. For example, a firmware bootstrapping program may auto-load a starting address of the feeder program into the DMA engine's program counter 293. The feeder program is then executed by the DMA processor core's instruction pipeline 292, initiating a pre-programmed transfer of data to one-or-more processing elements 170. Thereafter, the processing element(s) 170 begin processing the data.

While the processing elements 170 begins processing the data, the feeder program on the DMA engine 164 may make preparation to send additional data, initiating data retrieval from memory (e.g., cluster memory) prior to even receiving an indication from the processing element 170 that it is ready for more data. The feeder program may start sending the processing element(s) 170 more data so that by the time the processing element 170 has finished processing the first chunk of data that it received, the second data will be ready and waiting. As soon an instruction executed by the instruction pipeline 392 of the processing element 170 indicates to the DMA engine 164 that the processing element is ready for more data, the DMA engine 164 signals the processing element (e.g., setting an event flag register 388 or toggling a data line) indicating that the second chunk of data is ready and waiting. While the processing element 170 is processing the second chunk of data, the DMA engine 164 can be loading the third chunk of data into the processing element 170, such that when the processing element is ready for it, the DMA engine can immediately signal that the third chunk of data is ready.

To facilitate these automatic transfers, an alternating range of addresses within the processing element's data registers 384 may be used by the DMA engine 164 for the loading of chunks of data. For example, odd chunks may be loaded into one block of registers, while even chunks may be loaded into another. This way, as soon as the processing element 170 indicates that it is done with a chunk of data and ready for more, that block of registers can be reloaded with not the next chunk of data, but rather, the chunk after that, whereas the next chunk of data to be processed has already been loaded into the other block of registers. In this manner, the stalling of the instruction pipeline 392 is kept to a minimum, and in some cases (depending in part on the predictability of the process being executed), may be eliminated entirely.

The instruction pipeline 392 of each processing element's processor core 390 executes instructions stored in its instruction registers 382 as specified by an address in its program counter 393. After an instruction is executed, the program counter 393 advances the address to the next instruction to be executed. Likewise, the instruction pipeline 292 of each DMA engine's processor core 290 executes instructions stored in its instruction registers 282 as specified by an address in its program counter 293. After an instruction is executed, the program counter 293 advances the address to the next instruction to be executed. However, while the processor core 390 of the processing element 170 may include the arithmetic logic unit (ALU) 394, the floating point unit (FPU) 396, and the operand write-back unit (398) to write the results of instruction execution into the data registers 384, the instruction pipeline 292 of the DMA engine 164 may produce writes to the serviced processing element(s) 170 in accordance with the feeder program, without producing other "results" to be locally stored, as provided by the simpler data-transfer-centric instruction set that may be utilized by the DMA engine 164 (than the processing units 170).

The instruction execution pipeline 392 of each processing element 170 executes instructions stored in its own instruction registers 382. The micro-sequencer 391 will fetch instructions from the program memory 374 (or other memory) and load them into the instruction registers 382 in accordance with the address indicated by the program counter 393. Thus, if the DMA engine 164 is not feeding instructions directly into a processing element's instruction registers 382, the DMA engine's feeder program may load instructions into the processing element's local program memory 374, to be fetched by the processing element's instruction pipeline 392 and loaded into instruction registers 382 for execution.

From the feeders program's viewpoint, the feeding of instructions is not different from the feeding of any other data. Specifically, the feeder program is programmed to transfer data into a set of memory addresses, and so it may transfer the data there and then signal to the processing element that the transfer is complete, without regard to the nature of the data. Whether this data comprises executable instructions or data such as operands for processing may be of no consequence.

Instructions loaded into the instruction registers 382 will be decoded by the instruction execution pipeline, any needed operands will be fetched from the data registers 384, the instruction will be executed (using the ALU 394 or FPU 396 in accordance with the decoded instruction), and the results will be written back to the data registers 384 using the operand write-back unit. Among other things, the feeder program executed by the DMA engine's processor core 290 can be programmed to continually fetch the data needed for the execution of the instructions being executed by the processing element 170, and to write that data directly into the processing element's data registers 384. By filling the data registers 384 continually of the processing element's core 390 (e.g., with operands or other data), stalling of the core's instruction pipeline 392 while it wait for data can be avoided.

The DMA engine 164 may be provided the ability to read data from relatively arbitrary locations using a global addressing scheme. A normal DMA usually can be set up to transfers from a fairly small number of fixed locations. For example, a normal DMA controller may be instructed to start a transfer from a memory address, to a destination address, where the transfer is for a specified amount of data. Similarly, a DMA controller may be provided a series of source memory addresses and destination memory addresses, and after one block of data is transferred, to advance to the next block. However, since the improved DMA engine 164 is executing programmed instructions, the address locations within any particular chunk of data need not be contiguous.

Ordinarily, when a processor needs data from different non-contiguous blocks of data, a DMA processor must perform multiple page loads, which takes time and costs energy. In comparison, the improved DMA engine 164 may provide the processor the specific data needed, chaining data from multiple non-contiguous locations in a single chunk.

Thus, in addition to reducing processor stalls, the improved DMA engine 164 can reduce the number of data transactions between itself and the processing elements 170, further accelerating execution.

The DMA engine's processor core 290 is executing instructions, and a series of instructions may be "copy" instructions to move data from one location to another location. For example, the "copy" instruction may send data on a source side (e.g., cluster memory 162) in ascending or descending address order to destination addresses (e.g., data registers 384)

So, for example, the feeder program can transfer 18 units of data from Location 0 and to Location 17 in cluster memory 162. Thereafter, the feeder program can transfer of one unit from another address corresponding to a memory accessed via memory controller 114 using one or more packets. This programmed randomness can continue as part of a transfer of a same transfer to the processing element 170, such as copying 16 units of data from another location, 2 units of data from another location, and so on. In other words, in a single DMA data transfer to the processing elements, every bit, byte, word, etc., can originate from a completely different region in memory (or from entirely different memories) than a previous bit, byte, word, etc.

Moreover, the transfers between the DMA engine 164 and processing elements 170 can fill a block of registers or memory in the processing element out-of-order. Since the processing element 170 can be configured to wait until a certain quantity of data is written (using the write counter 366) or to wait for the DMA engine 164 to cause an event flag in the event flag register(s) 388 to be set, performing a block transfer in an arbitrary order is not deleterious to operations. Since different portions of the data provided to the processing element 170 may have originated not just from non-contiguous memory addresses, but memories in physically different locations, the latency for the DMA engine 164 to retrieve some portions of a block may be different than other portions. Thus, the feeder program can execute multiple copy transactions in series, and then complete the copies out-of-order as the requested data reaches the DMA engine's fast feeder queue (e.g., data buffer 285) from the various memories.

As the DMA engine 164 executes the feeder program, the instruction pipeline 292 may fetch data from memory locations in a manner similar to what a CPU does, and thereafter write the data to its destination addresses in the processing element(s) 170. The assembly language instruction set used with the DMA engine's processor core 290 may be reduced down to essential fetch, copy, and store commands, looping commands, and commands to set and/or poll event flag registers, thereby avoiding the complexity of a regular processor core configured to execute a rich instruction set.

While feeder program is halted (644 "Yes") and the DMA engine 164 waits to receive a start address for a next program, the DMA engine 164 may enter a low power sleep state. The DMA engine 164 may be configured to wake upon data being written into its program counter 393, in response to data being written to its program memory 274 or instruction registers 282, and/or in response to a setting of one of its own even flag register(s) 288, such as by a processing element 170. If awakened without a new start address having been loaded into the micro-sequencer 291, the micro-sequencer 391 may be configured to default to an address specified by the bootloader.

As further context for the illustrated implementation of the DMA engine 164 in FIG. 1, the processor chip 100 will now be further described. The processor chip 100 may be composed of a large number of processing elements 170 (e.g., 256), connected together on chip via a switched or routed fabric similar to what is typically seen in a computer network.

In a network-on-a-chip example, communication between processing elements 170 of difference clusters 150 and superclusters 130 may be performed using packets, with each data transaction interface 372 connected to one or more bus networks, where each bus network comprises at least one data line. Each packet may include a target register's address (i.e., the address of the recipient) and a data payload. The address may be a global hierarchical address, such as identifying a multicore chip 100 among a plurality of interconnected multicore chips, a supercluster 130 of core clusters 150 on the chip, a core cluster 150 containing the target processing element 170, and an identifier of the individual execution register 380 within the target processing element 170. Within a cluster 150, processing elements 170 may communicate with each other using packets, or by direct data transfer via the inter-cluster router 160 (Level 4 in the hierarchy in FIG. 1).

Referring to the example chip 100 in FIG. 1, each chip 100 may include four superclusters 130a-130d, each supercluster 130 may comprise eight clusters 150a-150h, and each cluster 150 may comprise eight processing elements 170a-170h. If each core 390 includes 2048 data registers, then a minimum of eleven bits are needed to identify registers individually. To address the registers between the processing elements 170a-h within a cluster, the intra-cluster bus would need to accommodate at least fourteen bits, using three bits to identify the destination processing element and eleven bits to identify the individual data register 384 within the processing element.

To address the data registers 384 globally using packets, the address of each data register 384 would include at least a nineteen bit address: two bits to identify the supercluster, three bits to identify the cluster, three bits to identify the processing element, and eleven bits to identify the data register 384. In a multi-chip environment, the global address may include additional bits, such as bits to identify the processor chip 100. Such global addressing may also accommodate the physical and/or virtual addresses of a main memory accessible by all of the processing elements 170 of a chip 100, tiered memory locally shared by the processing elements 170 (e.g., cluster memory 162), etc.

A processor core 390 may directly access its own execution registers 380 using address lines and data lines, while communications between processing elements within a same cluster may be bus-based or packet-based. The bus-based networks may comprise address lines and data lines, conveying addresses via the address lines and data via the data lines. In comparison, the packet-based network comprise a single serial data-line, or plural data lines, conveying addresses in packet headers and data in packet bodies via the data line(s).

Each DMA engine 164 can send packets via its own data transaction interface 272, and a packet can convey an address and mask for an event flag within it so that when the packet is delivered to a remote processing element 170, and that remote processing element sends data to another processing element specified in the packet, the remote processing element will signal the receiving processing element that the data has arrived and is ready to be processed.

For example, the feeder program executed by the DMA engine 164 can send a packet to a component in a different cluster requesting data. The packet conveys the addresses where the requested data is to be written, such as the addresses of the data registers 384 of a processing element 170 serviced by the DMA engine 164. The packet can also include an address of an event flag register 388 of that same processing element 170 with a write instruction, where the write will serve as an interrupt informing the processing element 170 that the data has arrived. In other words, DMA engine 164 can be programmed to initiate indirect data transfers, where the requested data never passes through the DMA engine 164.

The "write" transaction into the data registers 384 from outside the cluster may thus be received from another processor core 390, or any operational element, such as a memory controller 114, an external host processor connected to the chip 100, a field programmable gate array, or any other element communicably connected to a processor chip 100 that is able to communicate in the packet format.

A data transaction interface 372 associated with each processing element may execute such read, write, and reply operations without necessitating action by the processor core 390 associated with an accessed register. Thus, if the destination address for a read transaction is a data register 384 of a processing element 170, the data sent in reply to the transaction request may be placed in a destination register without further action by the processor core 390 associated with the destination register. Thus, to initiate a three-way write transaction are undertaken, a DMA engine 164 or first processing element 170x will issue a request for data to a component such as a second processing element 170y, with the destination address for the reply being a register located in a third processing element 170z. While the DMA engines 164 may send packets, they need not be able to receive packets.

Figure 7:
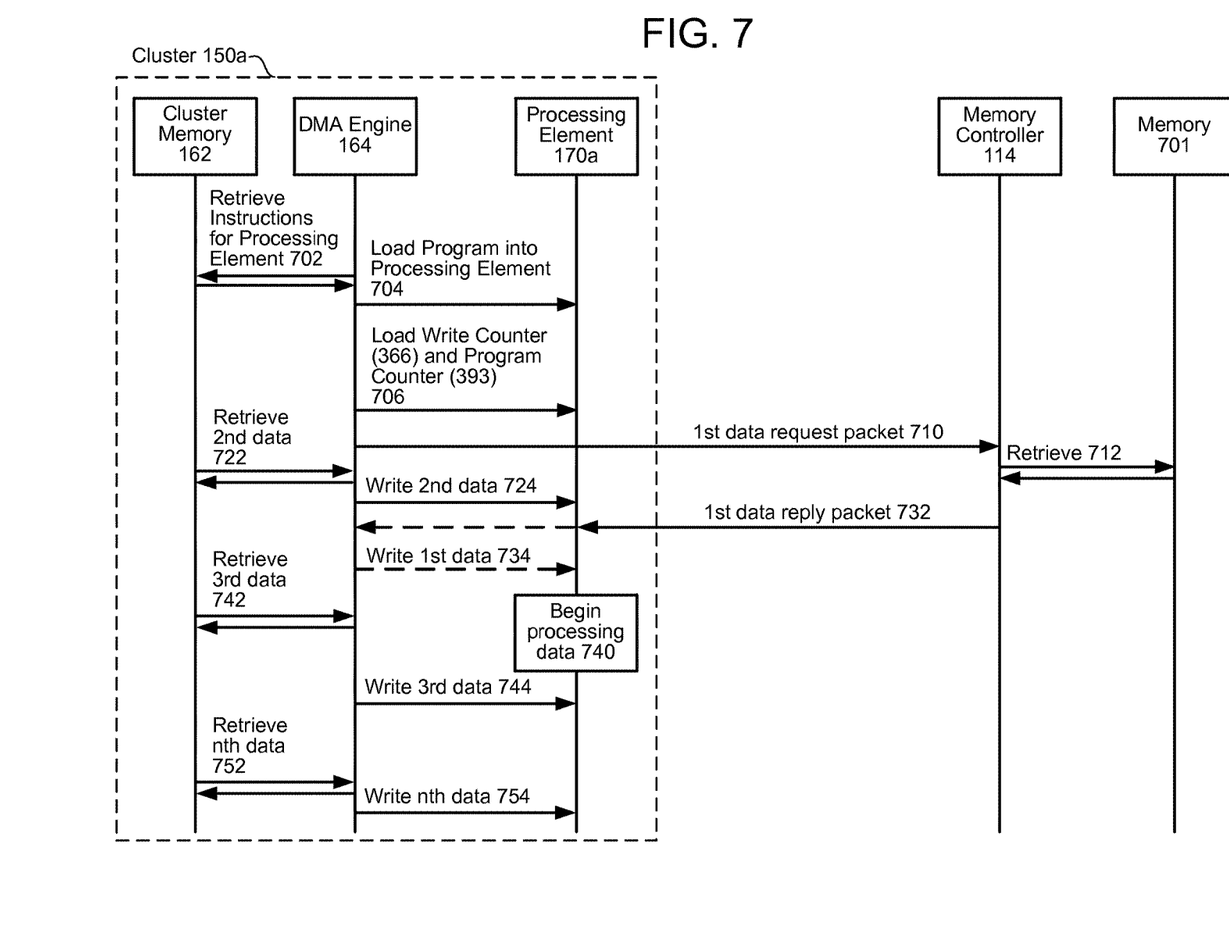
FIG. 7 illustrates an example of transactions between components, where a DMA engine instructs a remote component to load data into a processing element.

FIG. 7 illustrates an example of transactions initiated by a feeder program to transfer data into the registers of an associated processing element 170a. In this example, the DMA engine 164 retrieves data directly from cluster memory 162 on its own, and data from a remote memory 701 via requests to the remote memory controller 114 As illustrated, the feeder program is already running on the DMA engine 164.

The feeder program retrieves (702) instructions for the processing element 170a and loads (704) the instructions into the processing element's program memory 374 or instruction registers 382. The feeder program then loads (706) the processing element's write counter (366) with how many data writes-with-decrement to wait for before processing the data, and loads the program counter 393 with the starting address of the instructions it loaded (in 704). The loaded instructions configure the processing element 170a to wait until two writes-with-decrement are received.

The feeder program then sends (710) a request packet for first data to the memory controller 114, and retrieves (722) second data from the cluster memory 162 while the memory controller 114 retrieves (712) the first data from memory 701 for return in a reply packet (732). The second data is placed in the DMA engine's queue (data buffer 285). The second data is written (724) into either the program memory 374 or the data registers 384 of the processing element 170a in first-in-first-out (FIFO) order, with the final write of the second data being a write-with-decrement.

The DMA engine 164 receives the first data reply packet (732) from the memory controller 114, with the data transaction interface 272 loading the packet payload into the queue (data buffer 285). The first data is written (734) into either the program memory 374 or the data registers 384 of the processing element 170a in first-in-first-out (FIFO) order, with the final write of the second data being a write-with-decrement.

The second write-with-decrement triggers an event flag in the processing element 170, causing the instructions loaded into the processing element 170a to begin processing (740) the data (i.e., the first data and the second data). Independent of the processing element's operations, the DMA engine 164 proceeds to retrieve (742) third data from cluster memory 162 and to write (744) the third data to the processing element 170a. The third data may be written without decrement, since use of the write counter was to assure that the processing element 170a had the seed first and second data before processing began. Data can be continuously fed by the program feeder to the instruction executing on the processing element 170a, such as retrieving "nth" data (752) from cluster memory 162, and writing (754) the nth data to the processing element 170a.

As an alternative to having the memory controller 114 send (732) the first data back to the DMA engine 164, the data request packet (710) can specify that a start address for writing the first data that corresponds to an address in the program memory 374 or instruction registers 382 of the processing element 170a. In such a three-way transaction, the first data is transmitted by packet from the memory controller 114 to the data transaction interface 372 of the processing element 170. As specified in the data request packet (710), the reply packet may include a flag or mask that causes the last write from the reply payload to be written with-decrement. The data transaction interface 372 then writes received packet payload to the specified address within the processing element 170 and decrements (365) the write counter (366), triggering the start of data processing (740) by the processing element.

While a DMA engine 164 may simultaneously multi-cast data to multiple connected processing elements (e.g., using bus 166 illustrated in FIG. 4), packet based transactions are point-to-point. Two approaches may be used to provide simultaneous multi-cast of data to multiple processing elements within a cluster. One is to configure the intra-cluster router (L4) 160 as the destination for the packet, with a mask configuring the L4 router (160) to transfer the received packet to registers in specific processing elements 170a-h designated by the mask. For example, if an eight bit mask is used, and the first and third bits are true but the others are false, then data would be stored in processing element zero 170a and processing element two 170c, but not the other processing elements in the cluster.

Another approach for multi-casting data originating received via packet is to instruction the remote device (e.g., memory controller 114) to store the needed data in a memory directly accessible to the DMA engine 164, from which the DMA engine 164 may then multi-cast the data. If the DMA engine 164 is configured only to send but not receive packets, a data-is-ready signal can instead be provided by the remote device writing to an address in cluster memory 162 which is configured to serve as a surrogate interrupt, which the feeder program of the DMA engine 164 will poll to determine readiness/data availability.

Memory used with the processor chip 100 may also be hierarchical. Each processing element 170 may have a local program memory 374 and/or instruction registers 382 containing instructions that will be fetched by the micro-sequencer 391 in accordance with a program counter 393. Likewise, each DMA engine 164 may have a local program memory 274 and instruction registers 282 containing instructions that will be fetched by the micro-sequencer 291 in accordance with a program counter 293.

Processing elements 170 within a cluster 150 may also share the cluster memory 162, such as a shared memory serving a cluster 150 including eight processing elements via memory bus 469. While a processor core 390 may experience little or no latency (e.g., a latency of one-or-two cycles of the clock controlling timing of the instruction pipeline 392) when accessing its own data registers 384, accessing addresses external to a processing element 170 may experience a larger latency due to (among other things) the physical distance between components. As a result of this additional latency, the time needed for a processor core to access an external main memory 701, a shared cluster memory 162, and the registers of other processing elements may be greater than the time needed for a core 390 to access its own execution registers 380. By virtue of the DMA engine 164 preloading those execution registers 380 and/or program memory 374, such latency may be eliminated.

Data transactions external to a cluster 150 may be implemented with a packet-based protocol carried over a router-based or switch-based on-chip network. The chip 100 in FIG. 1 illustrates a router-based example. Each tier in the architecture hierarchy may include a router. For example, in the top tier, a chip-level router (L1) 110 routes packets between chips via one or more high-speed serial busses 112a, 112b, routes packets to-and-from a memory controller 114 that manages primary general-purpose memory for the chip, and routes packets to-and-from lower tier routers.

The superclusters 130a-130d may be interconnected via an inter-supercluster router (L2) 120 which routes transactions between superclusters and between a supercluster and the chip-level router (L1) 110. Each supercluster 130 may include an inter-cluster router (L3) 140 which routes transactions between each cluster 150 in the supercluster 130, and between a cluster 150 and the inter-supercluster router (L2). Each cluster 150 may include an intra-cluster router (L4) 160 which routes transactions between each processing element 170 in the cluster 150, and between a processing element 170 and the inter-cluster router (L3). The level 4 (L4) intra-cluster router 160 may also direct packets between processing elements 170 of the cluster and a cluster memory 162. Tiers may also include cross-connects (not illustrated) to route packets between elements in a same tier in the hierarchy. A processor core 390 may directly access its own data registers 384 without use of a global address. A DMA engine 164 serving a processor core 390 within a cluster 150 may also directly access the processor core's data registers 384 without use of a global address.

Figure 8:
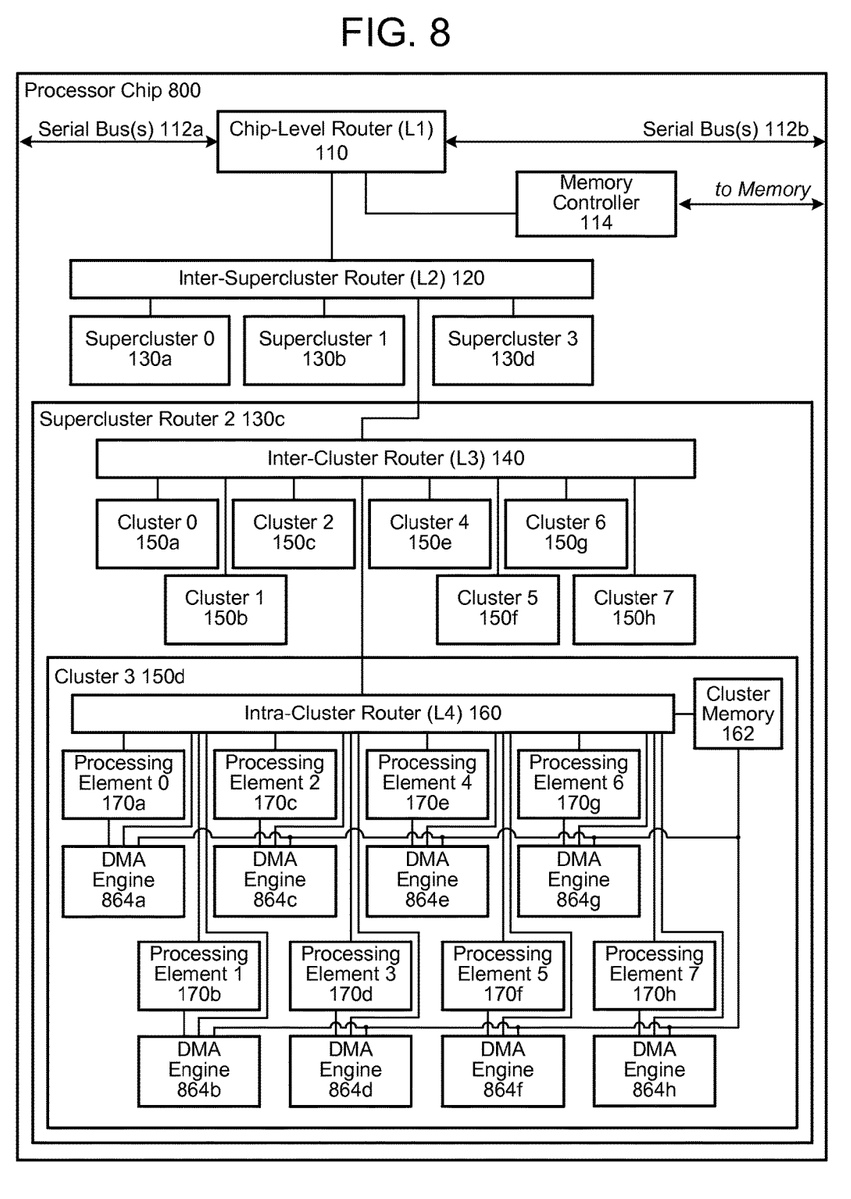
FIG. 8 is a block diagram conceptually illustrating an example of a network-on-a-chip processor where each processing element is paired with a DMA engine.

FIG. 8 illustrates an alternative configuration of a processor chip 800 where each processing element 170a-h in a cluster 150 is provided with its own DMA engine 864a-h. The operation and structure of the each DMA engine 864 is the same as described in connection with DMA engine 164, except that multi-casting to multiple processing elements is not supported. Providing each processing element 170 with its own DMA engine 864 may be better suited to asynchronous data processing than the shared configuration in FIG. 1. In particular, each DMA engine 864 can feed data to its associated processing element 170 without the feeder program needing to be configured with consideration given to the state of other processing elements in the cluster, as might be the case where multi-cast transactions are used.

The instructions and programs executed by components of the processor chip 100/800, including the feeder programs(s) executed by the DMA engine 164 and the instructions executed by the processing elements 170, together with associated operands and data, may be implemented as an article of manufacture such as a memory device or non-transitory computer readable storage medium storing the combined code and portions of the data to be executed as described above (e.g., in connection with FIGS. 6 and 7). The computer readable storage medium may be readable by processor cores 290 and 390, and may comprise instructions for causing the processor chip 100/800 or other device to perform processes as described in the present disclosure. The computer readable storage medium may be implemented by a volatile computer memory, non-volatile computer memory, hard drive, solid-state memory, flash drive, removable disk and/or other media. Discussed features such as bootloader programs which direct a DMA engine 164 or processing element 170 to load a program starting at a specified address into their program counters 293 and 393 may be implemented as firmware. In addition, portions of the data transaction interfaces 272 and 372 may be implemented, in part, as state machines in hardware. The processor chip 100/800 itself may be integrated on a monolithic semiconductor substrate. Components may be omitted, but a system includes at least one DMA engine 164 and one processing element 170.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the fields of computers, microprocessor design, and network architectures should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

As used in this disclosure, the term "a" or "one" may include one or more items unless specifically stated otherwise. Further, the phrase "based on" is intended to mean "based at least in part on" unless specifically stated otherwise.

What is claimed is:

1. A multiprocessor integrated on a semiconductor chip comprising:
   a direct memory access (DMA) processor;
   a first processing element comprising:
      a first processor core; and
      a plurality of first data registers that are directly accessible to the first processor core;
   a second processing element comprising:
      a second processor core; and
      a plurality of second data registers that are directly accessible to the second processor core; and
   one or more busses communicably interconnecting the first and second processing elements to the DMA processor; and
   a memory including first instructions operable to be executed by the DMA processor to configure the DMA processor to:
      retrieve first data from the memory;
      write, during a time period, the first data into the plurality of first data registers of the first processing element via the one or more busses; and write, during the time period, the first data into the plurality of second data registers of the second processing element via the one or more busses.

2. The multiprocessor of claim 1, wherein the one or more busses include a dedicated address bit line for each of the plurality of processing elements, the first instructions configure the DMA processor to control which of the multiple processing elements are written to by setting a state of the dedicated address bit lines.

3. The multiprocessor of claim 1, the DMA processor comprising a queue, wherein the first instructions configure the DMA processor to:
store the first data retrieved from the memory in the queue,
wherein the DMA processor writes the first data into the plurality of first data registers of the first processing element from the queue.

4. The multiprocessor of claim 1, the first processing element further comprising a plurality of instruction registers, the processor core of the first processing element configured to load instructions for execution from the instruction registers, and the memory further including second instructions operable to be executed by the processor core of the first processing element, wherein the first instructions further configure the DMA processor to:
write the second instructions into the plurality of instruction registers of the first processing element, prior to writing the first data into the plurality of first data registers of the first processing element,
wherein the first data comprises operands for the second instructions.

5. The multiprocessor of claim 1, further comprising:
a packet router connected to the DMA processor and the first and second processing elements; and
a remote processing component communicably connected to the DMA processor and the first and second processing elements,
wherein the first instructions further configure the DMA processor to:
send a first request to the remote processing component via the packet router, instructing the remote processing component to:
retrieve second data, and
write the second data into the plurality of first data registers of the first processing element via the packet router.

6. The multiprocessor of claim 1, wherein the first instructions configure the DMA processor to:
retrieve second data from the memory, prior to the first processing element completing processing of the first data; and
write the second data into the plurality of first data registers.

7. The multiprocessor of claim 2, wherein the one or more busses further include a shared bus interconnecting the first and second processing elements to each other and to the DMA processor, the first instructions configuring the DMA processor to write to the plurality of first data registers of the first processing element and to the plurality of second data registers of the second processing element at the same time using the shared bus.

8. The multiprocessor of claim 4, the memory further including third instructions, wherein the first instructions further configure the DMA processor to:
receive an address corresponding to a start of the third instructions in the memory from the first processing element; and
load and execute the third instructions.

9. The multiprocessor of claim 7, further comprising a memory bus communicably interconnecting the DMA processor to the memory, wherein a maximum data transfer rate of the memory bus is greater than a maximum data transfer rate of the shared bus.

10. The multiprocessor of claim 4, wherein the first processing element further includes a counter configured to decrement in response to a write to the plurality of first data registers of the first processing element, the first instructions further configuring the DMA processor to:
write a count value to the counter of the first processing element via the one or more busses, prior to writing the first data,
wherein the processor core of the first processing element executing the second instructions processes the first data in response to the counter reaching zero after the counter is decremented in response to the first data being written to the plurality of first data registers of the first processing element.

11. A method of providing instructions and data to processors in a multiprocessor system, the method comprising:
loading first instructions into an instruction pipeline of a direct memory access (DMA) processor;
retrieving second instructions from memory in accordance with the first instructions;
writing the second instructions into instruction registers of a first processor;
retrieving first data from memory in accordance with the first instructions;
writing the first data into first data registers of the first processor;
retrieving second data from memory in accordance with the first instructions, prior to the first processor completing processing of the first data in accordance with the second instructions; and
writing the second data into second data registers of the first processor.

12. The method of claim 11, further comprising:
retrieving third instructions from memory in accordance with the first instructions;
writing the third instructions into instruction registers of a second processor; and
writing the second data into third data registers of the second processor while writing the second data into the second data registers of the first processor, the second data to be processed by the second processor in accordance with the third instructions.

13. The method of claim 11, further comprising:
receiving, from the first processor, a starting address of third instructions in memory;
loading the third instructions into the instruction pipeline of the DMA processor;
retrieving third data from memory in accordance with the third instructions;
writing the third data into the first data registers of the first processor;
retrieving fourth data from memory in accordance with the third instructions, prior to the first processor completing processing of the third data in accordance with the second instructions; and
writing the fourth data into the second data registers of the first processor.

14. The method of claim 11, further comprising:
storing the second data retrieved from memory in a queue of the DMA processor, wherein the DMA processor writes the second data into the second plurality of data registers from the queue.

15. The method of claim 12, wherein writing the second data into the third data registers while writing the second data into the second data registers comprises:
   activating a first processor-specific bit line directly connecting the first processor to the DMA processor;
   activating a second processor-specific bit line directly connecting the second processor to the DMA processor;
   deactivating a third processor-specific bit line directly connecting a third processor to the DMA processor; and
   transmitting the second data over a shared bus communicably connecting the DMA processor to the first, second, and third processors while the first and second processor-specific bit lines are activated and the third processor-specific bit line is deactivated.

16. A non-transitory computer-readable storage medium storing processor-executable program code to configure a computing device to:
   load first instructions into an instruction pipeline of a direct memory access (DMA) processor of the computing device;
   retrieve second instructions from memory in accordance with the first instructions;
   write the second instructions into instruction registers of a first processor of the computing device;
   retrieve first data from memory in accordance with the first instructions;
   write the first data into first data registers of the first processor;
   retrieve second data from memory in accordance with the first instructions, prior to the first processor completing processing of the first data in accordance with the second instructions; and
   write the second data into second data registers of the first processor.

17. The non-transitory computer-readable storage medium of claim 16, the processor-executable program code to further configure the computing device to:
   retrieve third instructions from memory in accordance with the first instructions;
   write the third instructions into instruction registers of a second processor of the computing device; and
   write the second data into third data registers of the second processor while writing the second data into the second data registers of the first processor, the second data to be processed by the second processor in accordance with the third instructions.

18. The non-transitory computer-readable storage medium of claim 16, the processor-executable program code to further configure the computing device to:
   receive, from the first processor, a starting address of third instructions in memory;
   load the third instructions into the instruction pipeline of the DMA processor;
   retrieve third data from memory in accordance with the third instructions;
   write the third data into the first data registers of the first processor;
   retrieve fourth data from memory in accordance with the third instructions, prior to the first processor completing processing of the third data in accordance with the second instructions; and
   write the fourth data into the second data registers of the first processor.

19. The non-transitory computer-readable storage medium of claim 16, the processor-executable program code to further configure the computing device to:
   store the second data retrieved from memory in a queue of the DMA processor,
   wherein the DMA processor writes the second data into the second data registers from the queue.

20. The non-transitory computer-readable storage medium of claim 17, the program code to write the second data into the third data registers while writing the second data into the second data registers further configuring the computing device to:
   activate a first processor-specific bit line directly connecting the first processor to the DMA processor;
   activate a second processor-specific bit line directly connecting the second processor to the DMA processor;
   deactivate a third processor-specific bit line directly connecting a third processor of the computing device to the DMA processor; and
   transmit the second data over a shared bus communicably connecting the DMA processor to the first, second, and third processors while the first and second processor-specific bit lines are activated and the third processor-specific bit line is deactivated.

* * * * *